US010087363B2

(12) United States Patent
Volk et al.

(10) Patent No.: US 10,087,363 B2
(45) Date of Patent: Oct. 2, 2018

(54) USING BORATED GALACTOMANNAN TO ENHANCE SWELLING OF SUPERABSORBENTS FOR FRACTURING APPLICATIONS

(71) Applicants: Alyssa Michelle Volk, Tomball, TX (US); Michael R. Farris, Tomball, TX (US); Paul S. Carman, Spring, TX (US); Hong Sun, Houston, TX (US); Scott G. Nelson, Cypress, TX (US); Harold D. Brannon, Magnolia, TX (US)

(72) Inventors: Alyssa Michelle Volk, Tomball, TX (US); Michael R. Farris, Tomball, TX (US); Paul S. Carman, Spring, TX (US); Hong Sun, Houston, TX (US); Scott G. Nelson, Cypress, TX (US); Harold D. Brannon, Magnolia, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/070,131

(22) Filed: Mar. 15, 2016

(65) Prior Publication Data

US 2017/0267915 A1    Sep. 21, 2017

(51) Int. Cl.
*E21B 43/26*    (2006.01)
*C09K 8/68*    (2006.01)
*C09K 8/90*    (2006.01)
*E21B 43/267*    (2006.01)

(52) U.S. Cl.
CPC .............. *C09K 8/68* (2013.01); *C09K 8/90* (2013.01); *E21B 43/26* (2013.01); *E21B 43/267* (2013.01)

(58) Field of Classification Search
CPC .......... C09K 8/68; C09K 8/90; E21B 43/267; E21B 43/26
See application file for complete search history.

(56) References Cited

U.S. PATENT DOCUMENTS

| 3,743,613 | A | * | 7/1973 | Coulter | C09J 105/00 |
| | | | | | 106/205.01 |
| 3,766,984 | A | * | 10/1973 | Nimerick | C09K 8/887 |
| | | | | | 166/294 |
| 3,808,195 | A | | 4/1974 | Shelso et al. | |
| 3,974,077 | A | * | 8/1976 | Free | C09K 8/685 |
| | | | | | 166/283 |

(Continued)

FOREIGN PATENT DOCUMENTS

EP    0205744 A2    12/1986

OTHER PUBLICATIONS

Chudzikowski, R.J. "Guar gum and its applications" Presented at the Symposium on "Gums and Thickeners" organised by the Society of Cosmetic Chemists of Great Britain, at Oxford, on Oct. 15, 1969; 18 pages.

(Continued)

*Primary Examiner* — Silvana C Runyan
(74) *Attorney, Agent, or Firm* — Cantor Colburn LLP

(57) ABSTRACT

A method of fracturing a subterranean formation penetrated by a well comprises: combining an aqueous carrier with a superabsorbent polymer and a borated galactomannan to form a hydraulic fracturing composition; and pumping the hydraulic fracturing composition into the well.

21 Claims, 6 Drawing Sheets

A ——— Control (60 ppt SAP in NM Synthetic Water)
B - - - - Control + 16 ppt borated guar (dry)
C - - - - - Control + 4 gpt borated guar (slurry in oil)

(56) References Cited

U.S. PATENT DOCUMENTS

| | | | |
|---|---|---|---|
| 5,226,481 A | 7/1993 | Le et al. | |
| 5,681,796 A * | 10/1997 | Nimerick | C09K 8/685 |
| | | | 166/308.5 |
| 7,268,101 B2 * | 9/2007 | van Batenburg | C09K 8/08 |
| | | | 166/294 |
| 8,636,066 B2 | 1/2014 | Gupta et al. | |
| 9,194,223 B2 | 11/2015 | Bell et al. | |
| 2006/0086501 A1 * | 4/2006 | Creel | C04B 28/26 |
| | | | 166/281 |
| 2007/0098677 A1 | 5/2007 | Asgharian | |
| 2014/0138087 A1 | 5/2014 | Gupta | |
| 2014/0332213 A1 | 11/2014 | Zhou et al. | |
| 2014/0332214 A1 * | 11/2014 | Zhou | E21B 43/267 |
| | | | 166/280.2 |
| 2014/0364343 A1 * | 12/2014 | Nelson | C09K 8/685 |
| | | | 507/211 |
| 2015/0096751 A1 | 4/2015 | Shen et al. | |

OTHER PUBLICATIONS

International Search Report, International Application No. PCT/US2017/022018, dated Jun. 21, 2017, Korean Intellectual Property Office; International Search Report 5 pages.
International Written Opinion, International Application No. PCT/US2017/022018, dated Jun. 21, 2017, Korean Intellectual Property Office; International Written Opinion 8 pages.

\* cited by examiner

USING BORATED GALACTOMANNAN TO ENHANCE SWELLING OF SUPERABSORBENTS FOR FRACTURING APPLICATIONS

BACKGROUND

Hydraulic fracturing increases the flow of desirable fluids such as oil and gas from a subterranean formation and involves placing a fracturing fluid into a subterranean formation or zone at a rate and pressure sufficient to impart a stress in the formation or zone with attendant production of a fracture in the formation or zone.

Beyond creating the fracture, the fracturing fluid also transports a proppant into the fracture. The proppant keeps the fracture open after release of the exerted pressure. Further, the proppant establishes conductive means in which the formation fluids flow to the borehole. Since the proppant provides a higher conductivity than the surrounding rock, the fracture has greater potential for production of hydrocarbons.

Commercial superabsorbents hydrate and swell to many folds of their original sizes, and have been proposed to be used in hydraulic fracturing applications to transport and place proppant in created fractures.

To minimize phase separation or settling of proppant before the fracture closes, the loading of the superabsorbents has to reach a certain level. In practice, it is always desirable to minimize the amount of absorbent materials to allow for easier and more complete degradation or "break" to leave less formation or proppant pack damage and to reduce cost. Accordingly, there is a need for methods that improve the hydration and/or swelling efficiency of superabsorbents. It would be a further advantage if such methods can improve the hydration and/or swelling efficiency of superabsorbents under challenging conditions, such as in water having certain degree of salinity.

BRIEF DESCRIPTION

In an embodiment, a method of fracturing a subterranean formation penetrated by a well comprises combining an aqueous carrier with a superabsorbent polymer and a borated galactomannan to form a hydraulic fracturing composition; and pumping the hydraulic fracturing composition into the well.

A method of improving the efficiency of a superabsorbent polymer to carry proppants in a hydraulic fracturing composition comprises combining a borated galactomannan with a superabsorbent polymer, an aqueous carrier, and a plurality of proppant particles to provide the hydraulic fracturing composition, the borated galactomannan being present in an amount effective to improve the efficiency of the superabsorbent polymer to carry proppant particles in the hydraulic fracturing composition.

A hydraulic fracturing composition comprises an aqueous carrier; greater than about 2 and less than about 30 pounds of a borated galactomannan per one thousand gallons of the hydraulic fracturing composition; and greater than about 20 and less than about 100 pounds of a superabsorbent polymer per one thousand gallons of the hydraulic fracturing composition.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
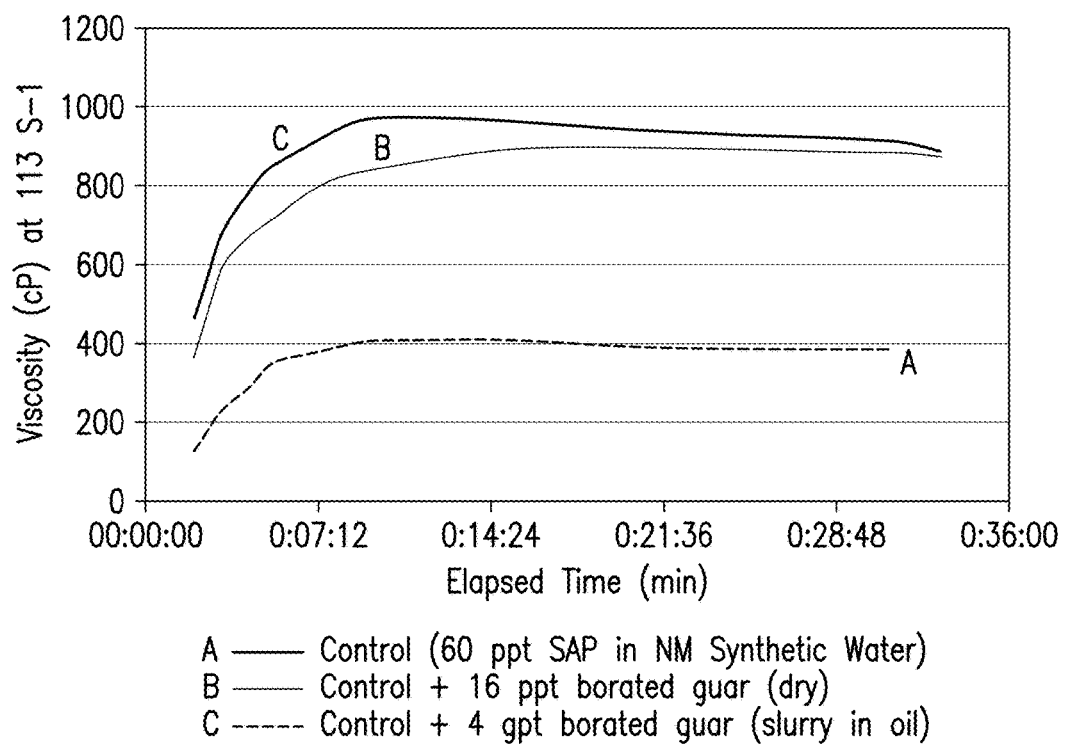
FIG. 1 shows the viscosity of various fluids in synthetic water A as a function of time, where sample A is a control containing synthetic water A and 60 pounds of a superabsorbent polymer per thousand gallons of sample A (ppt), sample B contains the control and 16 ppt of a borated guar in a dry form, and sample C contains the control and 4.0 gallons of a borated guar slurry in oil per one thousand gallons of fluid sample B (gpt)

The inventors hereof have discovered that fluids having excellent proppant suspension ability can unexpectedly be obtained by combining superabsorbent polymers with a small amount of a borated galactomannan. In particular, the inventors have discovered that the addition of a small amount of a borated galactomannan significantly improves the hydration and/or swelling of superabsorbent polymers as indicated by the increase of viscosity. The results are particularly surprising because a hydrated borated galactomannan alone imparts a very low viscosity to water. The results are also surprising because a borated galactomannan provides a much better hydration profile as compared to non-borated galactomannan. As an additional advantageous feature, a borated galactomannan is effective to improve the hydration/swelling of superabsorbent polymers in fresh water as well as in low quality water or water with certain degree of salinity.

The discovery allows superabsorbent polymers be used in water having different qualities at economic loadings. The improved efficiency allows for the use of less absorbent polymers to provide desirable proppant suspension and transportation. Using less superabsorbent polymers lowers overall fluid cost. In addition, using less superabsorbent polymers provides a lesser amount of polymer residues after breaking, which can lead to less formation damage.

In some embodiments, the borated galactomannan can provide one or more of the following additional benefits: better proppant suspension; better friction reduction without the use of a traditional/conventional friction reducer; the ability to use higher loadings of clay controls and surfactant; and a larger variety of breaker options, for example, using an enzyme to target the borated galactomannan and targeting the superabsorbents with the formation's salt environment or using an encapsulated breaker system.

A borated galactomannan used in the fracturing fluids described herein are galactomannan gums with incorporated borate ions. Such borated galactomannan gums are disclosed for example in U.S. Pat. No. 3,808,195. The borated galactomannan may be prepared by introducing the galactomannan to a material containing a borate ion, i.e., a material that can contribute a borate ion to the galactomannan.

Exemplary galactomannans include guar gum and its derivatives, such as natural or underivatized guar, enzyme treated guar gum (having been obtained by treating natural guar gum with galactosidase, mannosidase, or another enzyme) and derivatized guar. The derivatives of galactomannans include the water soluble derivatives such as carboxyalkyl ethers, for example, carboxymethyl ether derivatives, hydroxyalkyl ether derivatives such as hydroxyethyl ethers and hydroxypropyl ethers of galactomannan, carbamylethyl ethers of galactomannan, cationic galactomannans and depolymerized polygalactomannans.

Further, suitable derivatized guars include those prepared by treating natural guar gum with chemicals to introduce carboxyl groups, hydroxyl alkyl groups, sulfate groups, phosphate groups, etc. Exemplary guar derivatives include a hydroxyalkylated guar (such as hydroxypropyl guar, hydroxyethyl guar, hydroxybutyl guar) or modified hydroxyalkylated guars like carboxylated guars such as carboxyalkylated guars, like carboxy methyl guar as well as carboxylated alkylated hydroxyalkyl guars, such as carboxymethyl hydroxypropyl guar (CMHPG), including those having a molecular weight of about 1 to about 3 million. The carboxyl content of such guar derivatives may be expressed as Degree of Substitution ("DS") and ranges from about 0.08 to about 0.18 and the hydroxypropyl content may be expressed as Molar Substitution (MS) (defined as the number of moles of hydroxyalkyl groups per mole of anhydroglucose) and ranges between from about 0.2 to about 0.6.

Generally, the borated galactomannan is prepared by soaking galactomannan in an alkaline water solution of a material containing borate ions, allowing the galactomannan to absorb all of the solution and then milling and drying the galactomannan. The amount of water in the alkaline water solution is about equal to the amount of galactomannan. The solution is made alkaline with alkali metal or alkaline earth metal hydroxide. The concentration of the alkali metal or alkaline earth metal hydroxide in the solution is about 0.3% to 0.5% by weight based on the weight of the galactomannan. After the galactomannan is absorbed, it is milled and dried at temperature generally between from about 150° C. to about 250° C. to about the original moisture level of untreated galactomannan, generally containing about 9% to 12% water by weight. Further processes of preparing the borated galactomannan and its derivatives are set forth in U.S. Pat. No. 3,808,195.

Exemplary material containing a borate ion includes alkali metal, alkaline earth metal and ammonium salts of borate anions. Borate anions include tetraborate, metaborate and perborate anions. In an embodiment, the material containing borate ions is used in amounts such that the concentrations of the borate ion expressed as borax is about 0.05 wt. % to about 2 wt. %, specifically about 0.1 wt. % to about 1 wt. %, or about 0.1 wt. % to about 0.5 wt. %, based on the weight of the galactomannan gum.

Unhydrated borated galactomannan may be pumped into base fluid as a powder or as a slurry in a hydrocarbon such as a mineral oil. The amount of borated galactomannan in the fracturing fluid is between from about 1 pound or 2 pounds of borated galactomannan per thousand gallons of the fracturing fluid (ppt) to about 30 ppt, specifically from about 5 ppt to about 25 ppt or from about 10 ppt to about 20 ppt. When a hydrocarbon slurry is used, the amount of borated galactomannan in the slurry is between from about 3 pounds borated galactomannan per gallon (ppg) of hydrocarbon to 5 pounds per gallon of hydrocarbon.

As used herein, the superabsorbent polymer is a crosslinked polymer that is capable of absorbing large amounts of aqueous liquids, such as water, brine, acid, or base, with swelling and the formation of a gel or viscous material, and retains the absorbed fluid under a certain pressure or temperature. Superabsorbent polymer particles are particles of superabsorbent polymers or superabsorbent polymer compositions. The acronym SAP may be used in place of superabsorbent polymer, superabsorbent polymer composition, and particles or fibers (and the like) herein.

In an embodiment, the SAP includes a repeating unit derived from an acrylate, an acrylic acid or a salt thereof, an acrylamide, a vinylpyrrolidone, a vinyl ester (e.g., a vinyl acetate), a vinyl alcohol, a 2-acrylamide-2-methylpropane-sulfonic acid, a derivative thereof, or a combination thereof.

The SAP includes a plurality of crosslinks among the polymer chains of the SAP. According to an embodiment, the crosslinks are covalent and result from crosslinking within the SAP. In an embodiment, the crosslinker is an ethylenically unsaturated monomer that contains, e.g., two sites of ethylenic unsaturation (i.e., two ethylenically unsaturated double bonds), an ethylenically unsaturated double bond and a functional group that is reactive toward a functional group (e.g., an amide group) of the polymer chains of the SAP, or several functional groups that are reactive toward functional groups of the polymer chains of the SAP. In an embodiment, the degree of crosslinking in the SAP herein is selected to control the amount of swelling (i.e., fluid absorption or volume expansion) of the SAP.

Exemplary crosslinkers include a di(meth)acrylamide of a diamine such as a diacrylamide of piperazine, a $C_{1-8}$ alkylene bisacrylamide such as methylene bisacrylamide and ethylene bisacrylamide, an N-methylol compounds of an unsaturated amide such as N-methylol methacrylamide or N-methylol acrylamide, a (meth)acrylate esters of a di-, tri-, or tetrahydroxy compound such as ethylene glycol diacrylate, poly(ethyleneglycol) di(meth)acrylate, trimethylopropane tri(meth)acrylate, ethoxylated trimethylol tri(meth)acrylate, glycerol tri(meth)acrylate), ethoxylated glycerol tri(meth)acrylate, pentaerythritol tetra(meth)acrylate, ethoxylated pentaerythritol tetra(meth)acrylate, butanediol di(meth)acrylate), a divinyl or diallyl compound such as allyl (meth)acrylate, alkoxylated allyl(meth)acrylate, diallylamide of 2,2'-azobis(isobutyric acid), triallyl cyanurate, triallyl isocyanurate, maleic acid diallyl ester, polyallyl esters, tetraallyloxyethane, triallylamine, and tetraallylethylene diamine, a diols polyol, hydroxyallyl or acrylate compounds, and allyl esters of phosphoric acid or phosphorous acid. Specifically mentioned are water soluble diacrylates such as poly(ethylene glycol) diacrylate (e.g., PEG 200 diacrylate or PEG 400 diacrylate). A combination comprising any of the above-described crosslinkers can also be used. Additional crosslinks are described in US 2014/0332213, US 2014/0332214, and US 2015/0096751.

In an embodiment, the SAP is a particle (or fiber or other format) that includes surface crosslinks, which occur external to the interior of the SAP. The surface crosslinks, e.g., result from addition of a surface crosslinker to the SAP particle and heat-treatment. The surface crosslinks increase the crosslink density of the SAP near its surface with respect to the crosslinking density of the interior of the SAP. Some surface crosslinkers have a functional group that is reactive toward a group of the polymer chains of the SAP, e.g., an acid or amide group. The surface crosslinker are one of the previously mentioned crosslinkers and include a functional group such as an alcohol, amine, aldehyde, or carboxylate group. In an embodiment, surface crosslinkers have multiple different functional groups such as polyols, polyamines, polyaminoalcohols, and alkylene carbonates. The surface crosslinkers also provide the SAP with a chemical property that the polymer chains of the SAP did not have before surface crosslinking and control chemical properties of the SAP, e.g., hydrophobicity, hydrophilicity, or adhesiveness of the SAP to other materials such as minerals (e.g., silicates) or other chemicals such as petroleum compounds (e.g., hydrocarbons, asphaltene, and the like). Preferably the internal and external crosslinks are formed before the SAP is combined with the aqueous carrier and the proppant particles. Accordingly, the fracturing fluid can be free of crosslinking agents. In an embodiment, the SAP only has internal crosslinks and is free of any external crosslinks.

Non-limiting examples of SAPs include poly 2-hydroxyethyl acrylate, polyalkyl acrylate, polyacrylamide, poly methacrylamide, poly vinylpyrrolidone, poly vinyl acetate, polyacrylic acid, polyacrylic acid salt, or copolymers thereof. As a specific example, the SAP is polyacrylamide having crosslinks that are polyethylene glycol diacrylate. As another specific example, the SAP is a copolymer of acrylamide with, for example, maleic anhydride, vinyl acetate, ethylene oxide, ethylene glycol, acrylonitrile, or a combination thereof. Another specific example of SAP is polyacrylamide having crosslinks that are polyethylene glycol diacrylate. In some embodiments, the SAP is polyacrylic acid homopolymer or copolymer, wherein the crosslinks are vinyl ester oligomer. In an embodiment, the SAP is a copolymer of acrylic acid and sodium acrylate with crosslinks derived from polyethylene glycol diacrylate.

The SAP can be in a number of formats, including a particle (e.g., a powder), fiber, strand, braid, and the like, or a combination thereof. The size of the SAP is from 10 μm to 100,000 μm, specifically 50 μm to 10,000 μm, and more specifically 50 μm to 1,000 μm. As used herein, "size" refers to the largest linear dimension, e.g., a diameter in a spherical particle. Particles of the SAP are any shape including spherical, angular, and polyhedral. As used herein, "size" refers to the largest linear dimension, e.g., a diameter in a spherical particle. Particles of the SAP are any shape including spherical, angular, and polyhedral.

The SAP is present in a mass concentration from 15 pound of SAP per one thousand gallons of the fracturing fluid (ppt) to 200 ppt, specifically 20 ppt to 100 ppt, and more specifically 30 ppt to 80 ppt.

The SAP is useful as a carrier for a fluid or proppant particles. In a fracturing operation (e.g., hydraulic fracturing), the proppant particles disposed in the SAP remain in the fracture and prop open the fracture when pressure used to form the fracture is released as SAPs are broken in response to the breaking condition. The proppant particles have a size from 1 μm to 2,000 μm, specifically 10 μm to 1,000 μm, more specifically 10 μm to 500 μm, and even more specifically 200 μm to 850 μm. Further, the proppant particles have any shape including spherical, angular, and polyhedral and are monodisperse or polydisperse with an average particle size distribution that is unimodal or multimodal, e.g., bimodal.

The proppant particles include a ceramic, sand, a mineral, a naturally occurring proppant such as a nutshell, a seed shell, or a wood material, gravel, glass, resinous particles, polymeric particles, or a combination thereof. In an embodiment, the proppant particles are selected depending on the particular application of the hydraulic fracturing composition. Examples of the ceramic include an oxide-based ceramic, nitride-based ceramic, carbide-based ceramic, boride-based ceramic, silicide-based ceramic, or a combination thereof. In an embodiment, the oxide-based ceramic is silica ($SiO_2$), titanium dioxide ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

In an embodiment, the proppant particles are coated, e.g., with a resin. That is, individual proppant particles have a coating applied thereto. In this manner, if the proppant particles are compressed during or subsequent to, e.g., fracturing, at a pressure great enough to produce fine particles therefrom, the fine particles remain consolidated within the coating so they are not released into the formation. It is contemplated that fine particles decrease conduction of hydrocarbons (or other fluid) through fractures or pores in the fractures and are avoided by coating the proppant particles. Coating for the proppant particles include cured, partially cured, or uncured coatings of, e.g., a thermoset or thermoplastic resin. Curing the coating on the proppant particles occurs before or after disposal of the proppant particles in the SAP or before or after disposal of the hydraulic fracturing composition downhole, for example.

In the hydraulic fracturing fluid, the proppant particles are present in an amount effective to prop open the fracture without the geometry of the fracture being altered during settling of the formation when the proppant is released from the SAP. In a particular embodiment, the proppant particles are present in a mass concentration from 0.1 pounds per gallon (lb/gal) to 20 lb/gal, specifically 0.25 lb/gal to 16 lb/gal, and more specifically 0.25 lb/gal to 12 lb/gal, based on the total volume of the fluid. In the hydraulic fracturing composition, any ratio of the amount of the proppant particles to the amount of the SAP is applicable as long as the proppant particles are suspended in the gel formed by the SAP.

The aqueous carrier is an aqueous fluid that includes water, brine, an acid such as a mineral acid or an organic acid, or a base. Advantageously borated galactomannan improves the swelling and/or hydration of SAPs in fresh water, low quality water, as well as water having certain degree of salinity.

In an exemplary embodiment, the aqueous carrier comprises high quality fresh water or fresh water. Such an aqueous carrier has a total dissolved solid content (TDS) of equal to or less than about 400 parts per million (ppm) and a total hardness of less than about 100 parts per million based on calcium carbonate (equivalent to 40 parts per million based on calcium cation concentration). In another exemplary embodiment, the aqueous carrier comprises low quality water. Such an aqueous carrier has a total dissolved solid content of greater than about 400 ppm to less than about 6,000 ppm, greater than about 1,000 ppm to less than about 5,000 ppm, or greater than about 2,000 ppm to less than about 4,000 ppm. The hardness of a low quality water can be about 100 ppm to about 2,500 ppm, about 250 ppm to about 2,000 ppm, or about 500 ppm to about 1,500 ppm, normally expressed as calcium carbonate.

Total dissolved solids (TDS) are solids in an aqueous carrier that can pass through a filter having a pore size of 2 microns. TDS is a measure of the amount of material dissolved in water. This material can include carbonate, bicarbonate, chloride, sulfate, phosphate, nitrate, calcium, magnesium, sodium, organic ions, or other ions.

To measure TDS, an aqueous sample is filtered, and then the filtrate is evaporated in a pre-weighed dish and dried in an oven at 180° C., until the weight of the dish no longer changes. The increase in weight of the dish represents the total dissolved solids.

As used herein, hardness is the concentration of divalent cations including calcium, magnesium and strontium ions expressed as equivalent of calcium carbonate. The hardness is determined by measuring the level of divalent cations including calcium, magnesium and strontium ions (mg/L or ppm, which can be converted to mmol/L by dividing the concentration in mmol/L or ppm by atomic weights of the corresponding cations.) in the aqueous carrier and then converting the amount of the divalent cations to the amount of calcium carbonate according to the following: 100× divalent cation concentration (mmol/L).

The aqueous carrier can includes monovalent cations, polyvalent cations, or a combination comprising at least one of the foregoing. The monovalent cations include $K^+$, $Na^+$, or the like. The polyvalent cations in the brine can be $Mg^{2+}$, $Ca^{2+}$, $Zn^{2+}$, or a combination comprising at least one of the foregoing. In an embodiment, the aqueous carrier comprises about 10 ppm to about 8,000 ppm, about 10 ppm to about 400 ppm, about 20 ppm to about 500 ppm, or about 400 to about 8,000 ppm of combined monovalent and polyvalent cations.

The hydraulic fracturing composition can further include a breaker in some embodiments. The breaker contacts the SAP and/or the borated galactomannan to break the SAP and/or borated galactomannan. In an embodiment, the breaker contacts the SAP and breaks a bond in the backbone of the polymer chains of the SAP, a bond in the crosslinker, a bond between the crosslinker and a polymer chain of the SAP, or a combination thereof. That is, breaking the SAP includes disintegrating, decomposing, or dissociating the SAP such as by breaking bonds in the backbone of the SAP, breaking crosslinks among chains of the SAP, changing a geometrical conformation of the superabsorbent polymer, or a combination thereof. In this way, the viscosity of the hydraulic fracturing composition decreases. In some embodiments, the breaker breaks the SAP to form a decomposed polymer such as a plurality of fragments that have a lower molecular weight than the SAP.

The breaker includes an oxidizer such as a peroxide, a persulfate, a perphosphate, a perborate, a percarbonate, a persilicate, an oxyacid of a halogen, an oxyanion of halogen, a peracid, a derivative thereof, or a combination thereof.

The breaker is optionally encapsulated in an encapsulating material to prevent the breaker from contacting the SAP. The encapsulating material is configured to release the breaker in response to the breaking condition. The breaker is a solid or liquid. As a solid, the breaker is, e.g., a crystalline or granular material. In an embodiment, the solid is encapsulated or provided with a coating to delay its release or contact with the SAP. Encapsulating materials are the same or different as the coating material noted above with regard to the proppant particles. Methods of disposing the encapsulating material on the breaker are the same or different as for disposing the coating on the proppant particles. In an embodiment, a liquid breaker is dissolved in an aqueous solution or another suitable solvent.

The breaker can be present in the hydraulic fracturing composition in a mass concentration from 0.1 ppt to 20 ppt, specifically 0.2 ppt to 15 ppt, and more specifically, 0.25 ppt to 10 ppt, based on the total volume of the fluid.

The fracturing fluid can also contain one or more of the following additives: a scale inhibitor; a tracer; a pH-buffering agent; a lubricant; a clay stabilizer; an acid; a surfactant; a biocide; or a viscous polymer. The hydraulic fracturing fluid can be a liquid or a foam. Exemplary additives and methods to form liquid or foam fracturing fluid are described in US 2014/0332213, US 2014/0332214, and US 2015/0096751. In an embodiment, no crosslinking agent is added to a fracturing fluid containing the SAP and borated galactomannan.

The hydraulic fracturing composition can be made in a variety of ways. According to an embodiment, a process for making the hydraulic fracturing fluid includes contacting a superabsorbent polymer as disclosed herein with an aqueous carrier, and borated galactomannan.

The additive, if present, can be added to the fluid before or after disposing the SAP and the borated galactomannan. Optionally, the additive is added to the SAP and borated galactomannan. According to an embodiment, the breaker is added to the fluid before or after disposing the SAP and the borated galactomannan. Optionally, the breaker is added to the SAP and borated galactomannan.

In an embodiment, combining the components of the hydraulic fracturing composition is accomplished in a vessel such as a mixer, blender, and the like. In some embodiments, the hydraulic fracturing composition is injected without mixing, e.g. it is injected "on the fly". The components are mixed, agitated, stirred, and the like. In an embodiment, the components are combined as the hydraulic fracturing composition is being disposed downhole.

The hydraulic fracturing composition is useful e.g., to transport and dispose proppant particles in a fracture without the SAP and/or borated galactomannan being broken until after disposal of the proppant particles to prevent proppant particles from settling and therefore increase overall fractured surface area. According to an embodiment, the hydraulic fracturing composition is used to form the fracture. In an embodiment, a process for disposing a plurality of proppant particles in a fracture includes disposing a hydraulic fracturing composition in a downhole environment. In this method, forming a fracture in the downhole environment is accomplished by applying hydraulic force on the downhole environment from the hydraulic fracturing composition, disposing the hydraulic fracturing composition in the fracture, breaking the superabsorbent polymer after forming the fracture, and disposing the plurality of proppant particles in the fracture. In this manner, the proppant particles do not settle to the bottom of the fracture. The downhole environment is, e.g., a reservoir temperature, formation water, formation rock, sand, and the like, which contains, e.g., pores or veins of various sizes in such rock, sand, and the like.

In addition to disposing the hydraulic fracturing composition in the downhole environment for hydraulically fracturing the formation, the method also includes disposal of other elements such as water, a downhole fluid (e.g., brine or other above-mentioned fluids), a viscose polymer, or a combination thereof. Thus, in an embodiment, the method further includes disposing water, a viscose polymer, or a combination thereof in the downhole environment and forming the fracture with the hydraulic fracturing composition, water, the viscose polymer, or a combination thereof. The order of addition can be varied and the time of injecting each is the same or different. According to an embodiment, for hydraulically fracturing a formation, water or brine is disposed downhole with addition of friction reducer followed by injection of the viscose polymer. Subsequently, the hydraulic fracturing composition is injected followed by more water and then additional hydraulic fracturing composition or an SAP. In an embodiment, the initial injection of water (or brine) and the viscose polymer is, e.g., 15 minutes each although the length of injection times is different in some embodiments. The injection time for the hydraulic fracturing composition is the same or different as the water or viscose polymer, e.g., having a duration of two hours. It is contemplated that the injection time varies and is selected based on conditions of the formation and the properties of the hydraulic fracturing composition, other fluids (e.g., brine), viscose polymer, and the like.

The hydraulic fracturing composition and processes herein are illustrated further by the following non-limiting examples.

EXAMPLES

The materials used in the examples are described in Table 1.

TABLE 1

| Material | Chemical Description | Source, Vendor |
|---|---|---|
| Synthetic Water A | Water having a total hardness of 1,000 ppm and a total solid content of 2,500 ppm | Baker Hughes Inc. |
| Borated guar | Borated guar | Baker Hughes Inc. |
| Non-borated guar 1 | Carboxymethylhydroxypropyl guar | Baker Hughes Inc. |
| Non-borated guar 2 | Hydroxypropyl guar | Baker Hughes Inc. |
| Non-borated guar 3 | Carboxymethylguar | Baker Hughes Inc. |
| Non-borated cellulose derivative | Cellulose derivative polymer | Baker Hughes Inc. |
| SAP B | An acrylic acid based crosslinked polymer | |

Viscosity was measured using an Ofite M900 rheometer. Unless indicated otherwise, viscosity was measured at room temperature (23° C.).

Example 1

The example demonstrates the effect of a borated guar on the swelling and hydration efficiency of a superabsorbent polymer in water having a total hardness of 1,000 ppm and a total solid content of 2,500 ppm.

Control A contained 0.19 wt % of a borated guar in synthetic water A. Control B contained 0.72 wt. % of SAP B in synthetic water A. Sample 1 contained 0.19 wt. % of a borated guar and 0.72 wt. % of SAP B. The viscosity of Control A, Control B, and Sample 1 was tested under the same conditions.

Borated guar alone (Control A) provided a viscosity of about 10 cP at 511 $S^{-1}$. SAP B alone (Control B) provided a viscosity of about 300 cP at 511 $S^{-1}$. In contrast, a sample containing both a borated guar and SAP B had a viscosity over 1,000 cP at 511 $S^{-1}$. The results are summarized in Table 2.

TABLE 2

| Component | Unit | Control A | Sample 1 | Control B |
|---|---|---|---|---|
| Borated guar | Wt % | 0.19 | 0.19 | |
| SAP B | Wt % | | 0.72 | 0.72 |
| synthetic water A | Wt % | balance | balance | balance |
| Property | | | | |
| Viscosity at 511 $S^{-1}$ | cP | 10 | >1,000 | 300 |

The results demonstrate that using a small amount of a borated guar together with a superabsorbent polymer significantly improves the swelling and hydration efficiency of the superabsorbent polymer in water having a total hardness of 1,000 ppm and a total solid content of 2,500 ppm.

Example 2

The example demonstrates that the both a borated guar in a dry form and a borated guar in a slurry form improve the swelling and hydration efficiency of superabsorbent polymers in water having a high TDS and hardness level.

SAP B (60 ppt) and a borated guar in a dry form (16 ppt) or a borated guar in a slurry form (4.0 gpt) were added to synthetic water A to form Samples B and C respectively. Sample A (control) was made by adding SAP B (60 ppt) alone to synthetic water A. Viscosity development as a function of time was recorded. The results were summarized in FIG. 1.

The results indicate that the borated guar greatly improves the swelling of the superabsorbent polymer in water having a high TDS and high hardness level regardless whether it is in a dry form or in a slurry form.

Example 3

The example demonstrates that the positive effect of a borated guar on SAP's swelling efficiency also applies to water having a certain degree of salinity.

Figure 2:
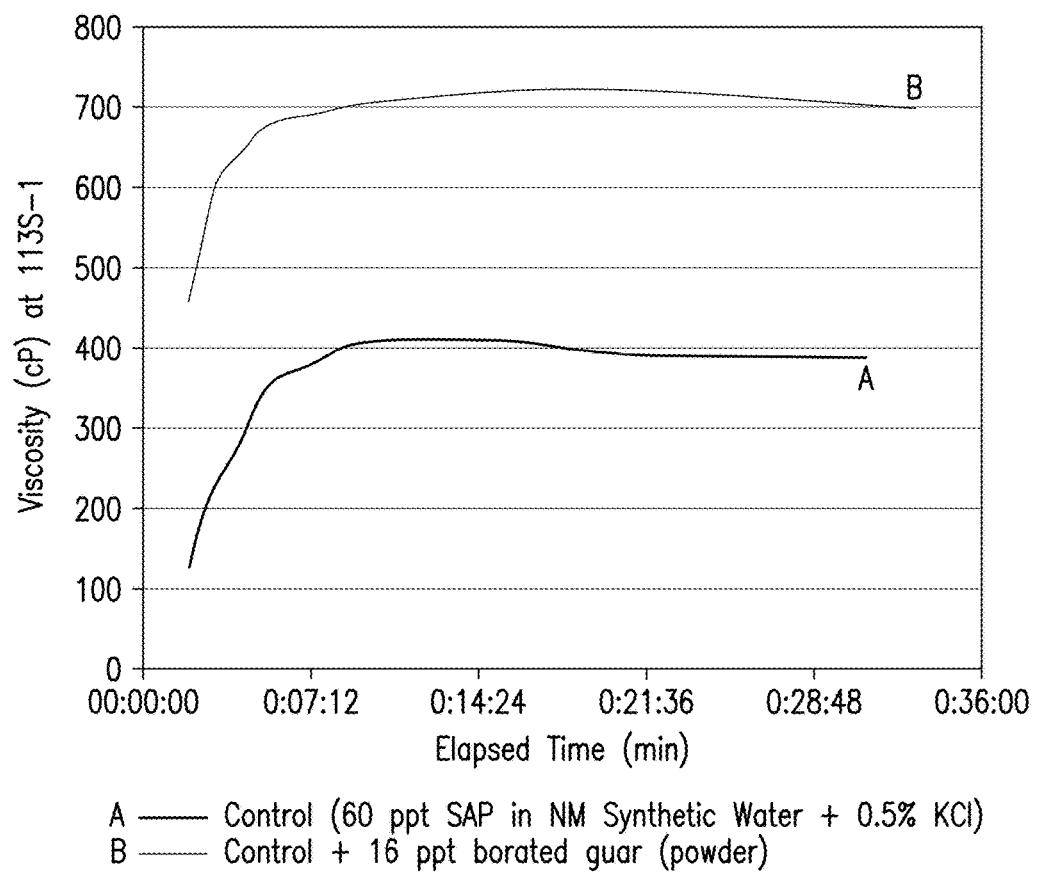
FIG. 2 shows the viscosity of various fluids in synthetic water A with 0.5 wt. % KCl added as a function of time, where sample A is a control and contains synthetic water A, 0.5% KCl and 60 ppt a superabsorbent polymer; and sample B contains the control and 16 ppt of a borated guar.
Figure 3:
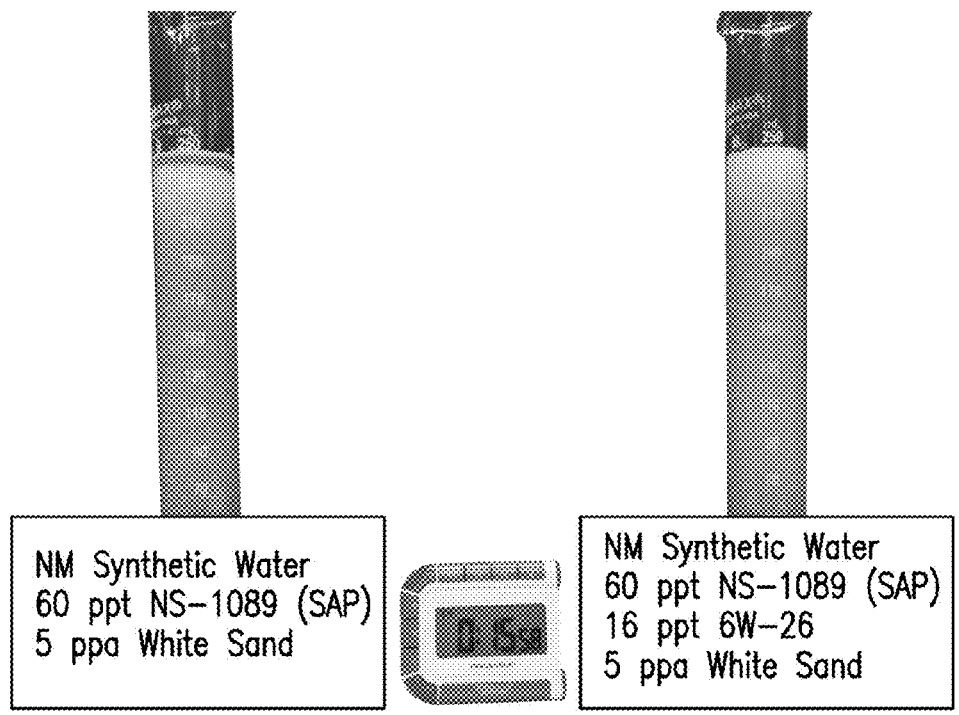
FIG. 3 shows the image of a control sample containing synthetic water A, 60 ppt of a superabsorbent polymer, and 5 pounds per gallon added (ppa) of proppant and the image of a sample containing a composition of the control and 16 ppt of a borated guar fifteen minutes after the samples are prepared.
Figure 4:
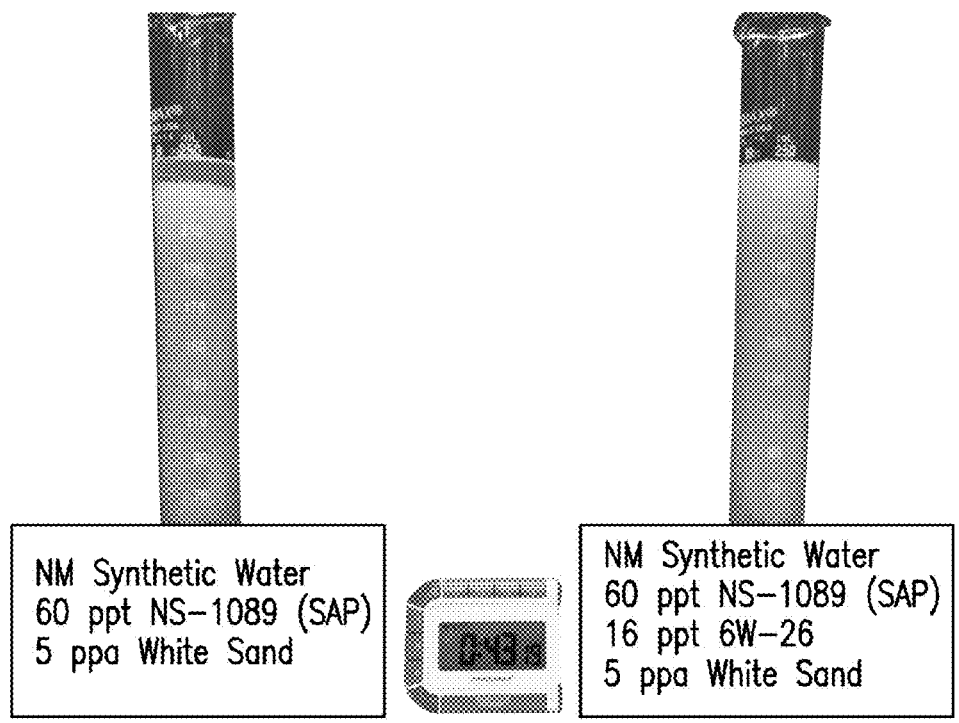
FIG. 4 shows the images of the samples of FIG. 3 forty-three minutes after the samples are prepared.
Figure 5:
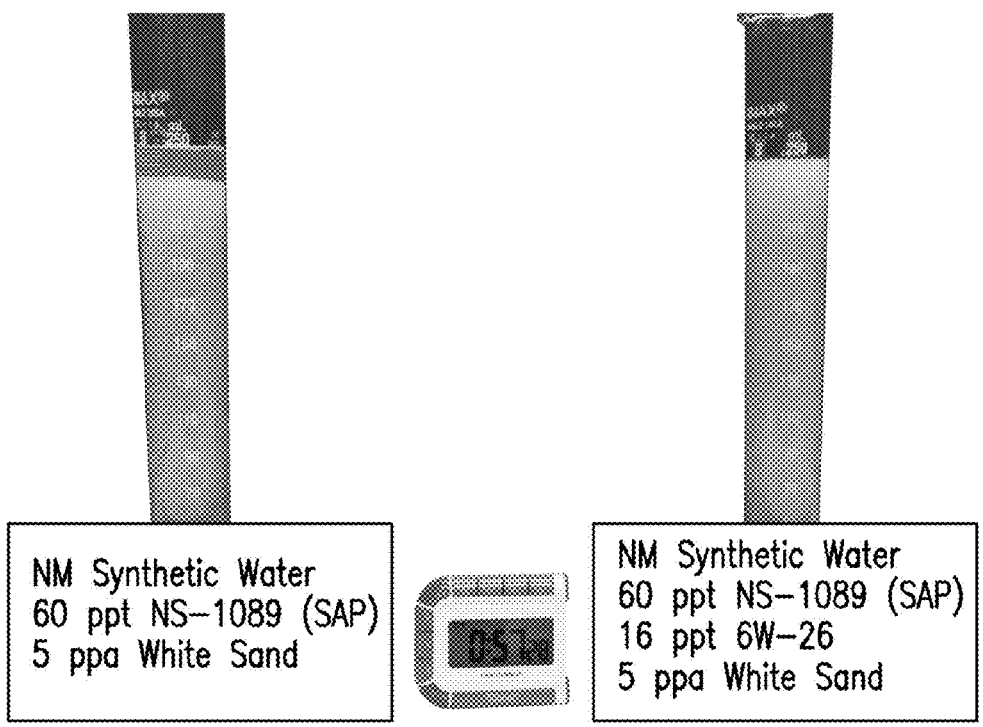
FIG. 5 shows the images of the samples of FIG. 3 fifty-seven minutes after the samples are prepared.
Figure 6:
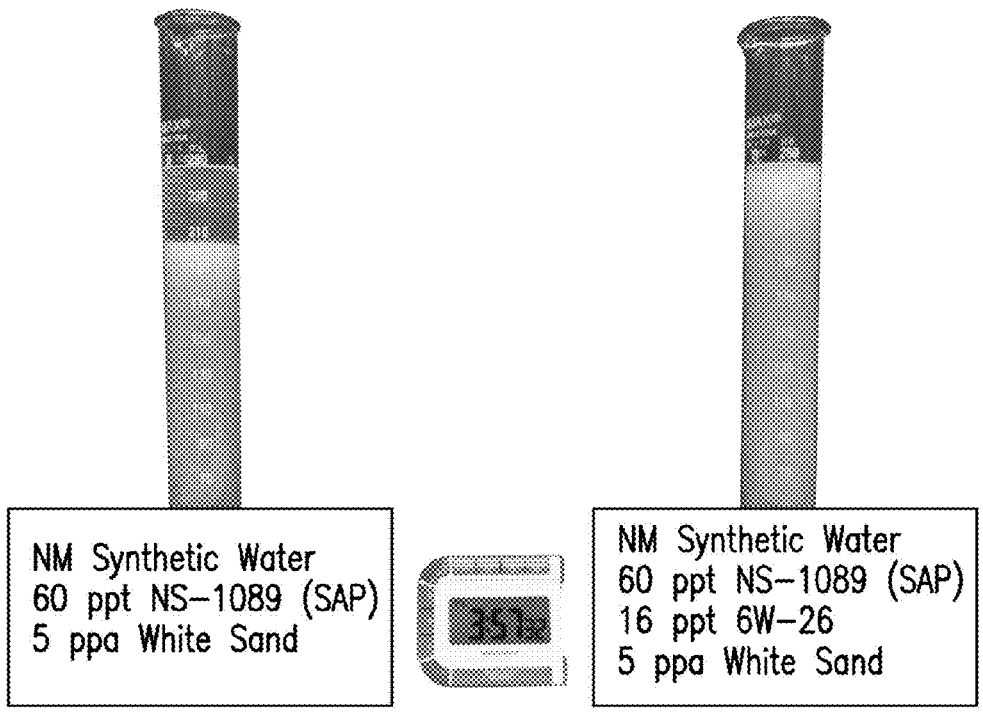
FIG. 6 shows the images of the samples of FIG. 3 three hours and fifty-seven minutes after the samples are prepared.
Figure 7:
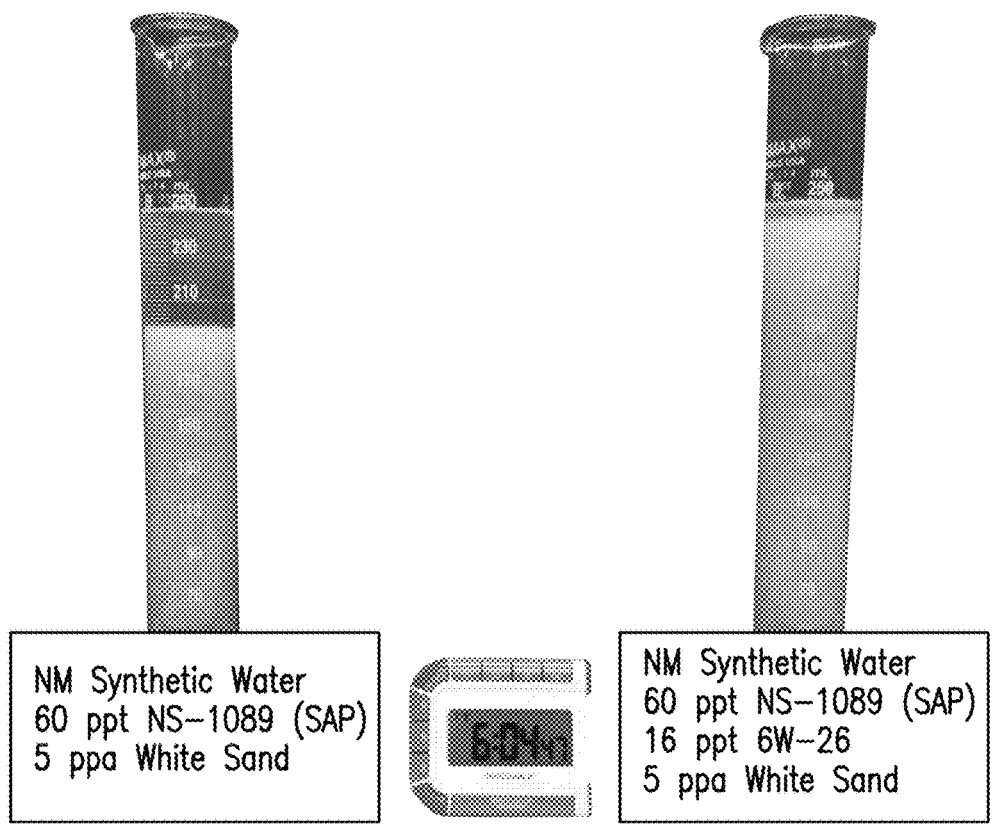
FIG. 7 shows the images of the samples of FIG. 3 six hours and four minutes after the samples are prepared.

FIG. 2 shows the viscosity of various samples in synthetic water A with 0.5 wt. % KCl. Sample A is a control of 60 ppt SAP B in synthetic water A with 0.5% KCl added. Sample B contained 16 ppt of a borated guar (dry form) in addition to 60 ppt SAP B in synthetic water A with 0.5% KCl added.

The results show that a borated guar is effective in improving the swelling of SAP in water containing 0.5 wt % of KCl.

Example 4

The example demonstrates that the enhancement of swelling is also observed in proppant suspension tests.

A control sample was prepared by mixing 60 ppt SAP B and 5 ppa (pounds per gallon added) of white sand in synthetic water A. Sample A was prepared by mixing 16 ppt of a borated guar, 60 ppt of SAP B, and 5 ppa of white sand in synthetic water A.

Pictures were taken at different times after the samples were prepared. The images are shown in FIGS. 3-7. As shown in these figures, sand in the control started settling within one hour, while sand of the same loading in Sample A showed no settling after 24 hours. The results demonstrate that a small amount of a borated guar is effective in improving the suspension ability of a superabsorbent polymer in water having high TDS and high total hardness.

Example 5

The example demonstrates that a borated guar provides a much better hydration profile (viscosity) than other non-borated guars. The example further shows that a borated guar has a better hydration profile than a non-borated cellulose derivative.

Figure 8:
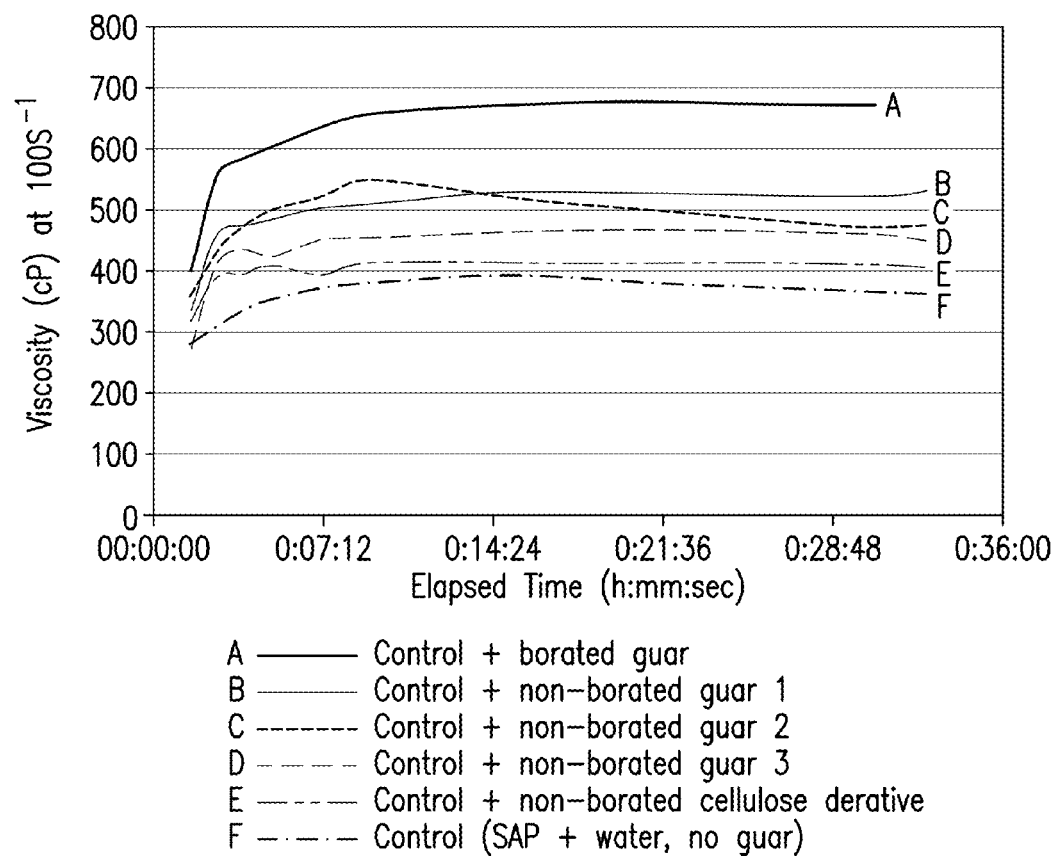
FIG. 8 compares the viscosity of samples containing borated or non-borated galactomannan as a function of time.

Samples A-E were prepared by mixing 16 ppt of a guar or a cellulose derivative and 60 ppt SAP B in synthetic water A, where Samples A-E contained a borated guar, non-borated guar 1, non-borated guar 2, non-borated guar 3, and a non-borated cellulose derivative respectively. Sample F is a control of 60 ppt of SAP B in synthetic water A. The viscosity development as a function of time for Samples A-F was recorded. The results are shown in FIG. 8. FIG. 8 confirms that the sample containing borated guar has significantly better hydration profile (viscosity) than non-borated guar or non-borated cellulose derivative.

Further included in this disclosure are the following specific embodiments, which do not necessarily limit the claims.

Embodiment 1

A method of fracturing a subterranean formation penetrated by a well, the method comprising:
combining an aqueous carrier with a superabsorbent polymer and a borated galactomannan to form a hydraulic fracturing composition; and
pumping the hydraulic fracturing composition into the well.

Embodiment 2

The method of Embodiment 1, wherein the hydraulic fracturing composition further comprises a plurality of proppant particles.

Embodiment 3

The method of Embodiment 1 or Embodiment 2, wherein the borated galactomannan comprises a borated guar, a borated guar derivative, or a combination comprising at least one of the foregoing.

Embodiment 4

The method of any one of Embodiments 1 to 3, wherein the borated galactomannan is present in an amount effective to increase the swelling or hydration of the superabsorbent polymer in the aqueous carrier.

Embodiment 5

The method of any one of Embodiments 1 to 4, wherein the hydraulic fracturing composition comprises greater than about 2 and less than about 30 pounds of the borated galactomannan per one thousand gallons of the hydraulic fracturing composition.

Embodiment 6

The method of any one of Embodiments 1 to 5, wherein the superabsorbent polymer comprises a repeating unit derived from an acrylic acid or a salt thereof, an acrylate, an acrylamide, a vinylpyrrolidone, a vinyl acetate, a vinyl alcohol, a 2-acrylamide-2-methylpropanesulfonic acid, a derivative thereof, or a combination thereof; and the superabsorbent polymer comprises a plurality of crosslinks.

Embodiment 7

The method of Embodiment 6, wherein the superabsorbent polymer is a copolymer of acrylic acid and sodium acrylate and comprises crosslinks derived from polyethylene glycol diacrylate.

Embodiment 8

The method of Embodiment 6, wherein the crosslinks of the superabsorbent polymer are formed prior to combining the superabsorbent polymer with the aqueous carrier and the borated galactomannan.

Embodiment 9

The method of any one of Embodiments 1 to 8, wherein hydraulic fracturing composition comprises greater than about 20 to less than about 100 pounds of the superabsorbent polymer per one thousand gallons of the hydraulic fracturing composition.

Embodiment 10

The method of any one of Embodiments 1 to 9, wherein the aqueous carrier having a total dissolved solid content of greater than about 400 parts per million to less than about 8,000 parts per million and a hardness of greater than about 100 parts per million to less than about 2,500 parts per million as calcium carbonate.

Embodiment 11

The method of any one of Embodiments 1 to 10, wherein the aqueous carrier has a total dissolved solid content of greater than about 1,000 parts per million to less than about 5,000 parts per million; and
a hardness of greater than about 250 parts per million to about 2,000 parts per million as calcium carbonate.

Embodiment 12

The method of any one of Embodiments 1 to 11, wherein the hydraulic fracturing composition further comprises a breaker; a scale inhibitor; a tracer; a pH-buffering agent; a lubricant; a clay stabilizer; an acid; a surfactant; a biocide; a viscous polymer; or a combination comprising at least one of the foregoing.

Embodiment 13

A method of improving the efficiency of a superabsorbent polymer to carry proppants in a hydraulic fracturing composition, the method comprising:

combining a borated galactomannan with a superabsorbent polymer, an aqueous carrier, and a plurality of proppant particles to provide the hydraulic fracturing composition, the borated galactomannan being present in an amount effective to improve the efficiency of the superabsorbent polymer to carry proppant particles in the hydraulic fracturing composition.

Embodiment 14

The method of Embodiment 13, wherein the hydraulic fracturing composition comprises greater than about 2 and less than about 30 pounds of the borated galactomannan per one thousand gallons of the hydraulic fracturing composition.

Embodiment 15

The method of Embodiment 13 or Embodiment 14, wherein the borated galactomannan comprises a borated guar, a borated guar derivative, or a combination comprising at least one of the foregoing.

Embodiment 16

The method of any one of Embodiments 13 to 15, wherein the aqueous carrier has a total dissolved solid content of greater than about 400 parts per million to less than about 8,000 parts per million and a hardness of greater than about 100 parts per million to less than about 2,500 parts per million as calcium carbonate.

Embodiment 17

The method of any one of Embodiments 13 to 16, wherein the superabsorbent polymer is a copolymer of acrylic acid and sodium acrylate and comprises crosslinks derived from polyethylene glycol diacrylate.

Embodiment 18

A hydraulic fracturing composition comprising:
an aqueous carrier;
greater than about 2 and less than about 30 pounds of a borated galactomannan per one thousand gallons of the hydraulic fracturing composition; and
greater than about 20 and less than about 100 pounds of a superabsorbent polymer per one thousand gallons of the hydraulic fracturing composition.

Embodiment 19

The hydraulic fracturing composition of Embodiment 18, wherein
the borated galactomannan comprises a borated guar, a borated guar derivative, or a combination comprising at least one of the foregoing; and
the superabsorbent polymer comprises a repeating unit derived from an acrylic acid or a salt thereof, an acrylate, an acrylamide, a vinylpyrrolidone, a vinyl acetate, a vinyl alcohol, a 2-acrylamide-2-methylpropanesulfonic acid, a derivative thereof, or a combination thereof; and the superabsorbent polymer comprises a plurality of crosslinks.

Embodiment 20

The hydraulic fracturing composition of Embodiment 18 or Embodiment 19, wherein the aqueous carrier has a total dissolved solid content of greater than about 400 parts per million to less than about 8,000 parts per million and a hardness of greater than about 100 parts per million to less than about 2,500 parts per million as calcium carbonate.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. As used herein, "combination" is inclusive of blends, mixtures, alloys, reaction products, and the like. Further As used herein, "a combination thereof" refers to a combination comprising at least one of the named constituents, components, compounds, or elements, optionally together with one or more like constituents, components, compounds, or elements not named. The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or."

The modifier "about" used in connection with a quantity is inclusive of the stated value and has the meaning dictated by the context (e.g., it includes the degree of error associated with measurement of the particular quantity). All references are incorporated herein by reference in their entirety.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

The invention claimed is:

1. A method of fracturing a subterranean formation penetrated by a well, the method comprising:
combining an aqueous carrier with a plurality of proppant particles, a superabsorbent polymer and a borated galactomannan as a powder, a slurry in a hydrocarbon, or a combination thereof to form a hydraulic fracturing composition; the borated galactomannan being present in an amount effective to increase the swelling or hydration of the superabsorbent polymer in the aqueous carrier; and
pumping the hydraulic fracturing composition into the well to create a fracture,
wherein the hydraulic fracturing composition comprises greater than about 2 and less than about 30 pounds of the borated galactomannan per one thousand gallons of the hydraulic fracturing composition and greater than about 20 to less than about 100 pounds of the superabsorbent polymer per one thousand gallons of the hydraulic fracturing composition;
the superabsorbent polymer comprises a repeating unit derived from an acrylic acid or a salt thereof, an acrylate, a vinylpyrrolidone, a vinyl acetate, a vinyl alcohol, a 2-acrylamide-2-methylpropanesulfonic acid, a derivative thereof, or a combination thereof; the superabsorbent polymer is free of repeating units derived from an acrylamide or a methacrylamide, and the superabsorbent polymer comprises a plurality of crosslinks; and
the hydraulic fracturing composition is free of a crosslinking agent.

2. The method of claim 1, wherein the borated galactomannan comprises a borated guar, a borated guar derivative, or a combination comprising at least one of the foregoing.

3. The method of claim 1, wherein the superabsorbent polymer is a copolymer of acrylic acid and sodium acrylate and comprises crosslinks derived from polyethylene glycol diacrylate.

4. The method of claim 1, wherein the crosslinks of the superabsorbent polymer are formed prior to combining the superabsorbent polymer with the aqueous carrier and the borated galactomannan.

5. The method of claim 1, wherein hydraulic fracturing composition comprises greater than about 30 to less than about 80 pounds of the superabsorbent polymer per one thousand gallons of the hydraulic fracturing composition.

6. The method of claim 1, wherein the aqueous carrier has a total dissolved solid content of greater than about 400 parts per million to less than about 8,000 parts per million and a hardness of greater than about 100 parts per million to less than about 2,500 parts per million as calcium carbonate.

7. The method of claim 1, wherein the aqueous carrier has a total dissolved solid content of greater than about 1,000 parts per million to less than about 5,000 parts per million; and
a hardness of greater than about 250 parts per million to about 2,000 parts per million as calcium carbonate.

8. The method of claim 1, wherein the hydraulic fracturing composition further comprises a breaker; a scale inhibitor; a tracer; a pH-buffering agent; a lubricant; a clay stabilizer; an acid; a surfactant; a biocide; a viscous polymer; or a combination comprising at least one of the foregoing.

9. The method of claim 1, wherein the amount of borated galactomannan in the slurry is between from about 3 pounds borated galactomannan per gallon of hydrocarbon to 5 pounds borated galactomannan per gallon of hydrocarbon.

10. The method of claim 1, wherein the hydraulic fracturing composition comprises about 5 to about 25 pounds of the borated galactomannan per one thousand gallons of the hydraulic fracturing composition.

11. The method of claim 1, wherein the hydraulic fracturing composition comprises about 10 to about 20 pounds of the borated galactomannan per one thousand gallons of the hydraulic fracturing composition.

12. The method of claim 1, wherein
the superabsorbent polymer comprises a copolymer of acrylic acid and sodium acrylate and has crosslinks derived from polyethylene glycol diacrylate; and
the hydraulic fracturing composition comprises 0.1 to 20 pounds of the proppant particles per gallon of the hydraulic fracturing composition, about 10 to about 20 pounds of the borated galactomannan per one thousand gallons of the hydraulic fracturing composition, and about 30 to less than about 80 pounds of the superabsorbent polymer per one thousand gallons of the hydraulic fracturing composition.

13. A method of improving the efficiency of a superabsorbent polymer to carry proppants in a hydraulic fracturing composition, the method comprising:
combining a borated galactomannan as a powder, a slurry in a hydrocarbon, or a combination thereof with a superabsorbent polymer, an aqueous carrier, and a plurality of proppant particles to provide the hydraulic fracturing composition, the borated galactomannan being present in an amount effective to increase the swelling or hydration of the superabsorbent polymer in the aqueous carrier and to improve the efficiency of the superabsorbent polymer to carry proppant particles in the hydraulic fracturing composition,
wherein the hydraulic fracturing composition comprises greater than about 20 to less than about 100 pounds of the superabsorbent polymer per one thousand gallons of the hydraulic fracturing composition; and greater than about 2 and less than about 30 pounds of the borated galactomannan per one thousand gallons of the hydraulic fracturing composition; and the hydraulic fracturing composition is free of a crosslinking agent,
the superabsorbent polymer comprises a repeating unit derived from an acrylic acid or a salt thereof, an acrylate, a vinylpyrrolidone, a vinyl acetate, a vinyl alcohol, a 2-acrylamide-2-methylpropanesulfonic acid, a derivative thereof, or a combination thereof; the superabsorbent polymer is free of repeating units derived from an acrylamide or a methacrylamide, and the superabsorbent polymer comprise a plurality of crosslinks.

14. The method of claim 13, wherein the borated galactomannan comprises a borated guar, a borated guar derivative, or a combination comprising at least one of the foregoing.

15. The method of claim 13, wherein the aqueous carrier has a total dissolved solid content of greater than about 400 parts per million to less than about 8,000 parts per million and a hardness of greater than about 100 parts per million to less than about 2,500 parts per million as calcium carbonate.

16. The method of claim 13, wherein the superabsorbent polymer is a copolymer of acrylic acid and sodium acrylate and comprises crosslinks derived from polyethylene glycol diacrylate.

17. A hydraulic fracturing composition comprising:
an aqueous carrier;
0.1 to 20 pounds of a plurality of proppant particles per gallon of the hydraulic fracturing composition;
greater than about 2 and less than about 30 pounds of a borated galactomannan per one thousand gallons of the hydraulic fracturing composition; and
greater than about 20 and less than about 100 pounds of a superabsorbent polymer per one thousand gallons of the hydraulic fracturing composition,
wherein the hydraulic fracturing composition is free of a crosslinking agent,
the superabsorbent polymer comprises a repeating unit derived from an acrylic acid or a salt thereof, an acrylate, a vinylpyrrolidone, a vinyl acetate, a vinyl alcohol, a 2-acrylamide-2-methylpropanesulfonic acid, a derivative thereof, or a combination thereof; the superabsorbent polymer is free of repeating units derived from an acrylamide or a methacrylamide, and the superabsorbent polymer comprise a plurality of crosslinks.

18. The hydraulic fracturing composition of claim 17, wherein
the borated galactomannan comprises a borated guar, a borated guar derivative, or a combination comprising at least one of the foregoing; and
the superabsorbent polymer comprises a copolymer of acrylic acid and sodium acrylate and has crosslinks derived from polyethlene glycol diacrylate.

19. The hydraulic fracturing composition of claim 17, wherein the aqueous carrier has a total dissolved solid content of greater than about 400 parts per million to less than about 8,000 parts per million and a hardness of greater than about 100 parts per million to less than about 2,500 parts per million as calcium carbonate.

20. The hydraulic fracturing composition of claim 17, further comprising a breaker.

21. The hydraulic fracturing composition of claim 20, wherein the breaker is present in the hydraulic fracturing composition in a mass concentration from about 0.1 pounds to about 20 pounds per one thousand gallons of the hydraulic fracturing fluid.

\* \* \* \* \*